United States Patent
Cullen

[19]

[11] Patent Number: 5,861,801
[45] Date of Patent: Jan. 19, 1999

[54] VEHICLE THEFT DETERRENT APPARATUS AND METHOD

[76] Inventor: James R. Cullen, 12000 4th St. North Apt. 42, St. Petersburg, Fla. 33716-1709

[21] Appl. No.: 937,387

[22] Filed: Sep. 25, 1997

Related U.S. Application Data

[63] Continuation-in-part of Ser. No. 507,831, Jul. 27, 1995, abandoned.

[51] Int. Cl.$^6$ ......................................................... G08B 5/38
[52] U.S. Cl. .......................... 340/426; 340/321; 340/331; 307/10.2; 307/10.8
[58] Field of Search ................................ 340/420.5, 426, 340/428, 331, 321, 333, 815.4, 815.45; 307/10.1, 10.2, 10.8; 362/61, 157, 800, 812

[56] References Cited

U.S. PATENT DOCUMENTS 3,720,918  3/1973  Perl ........................................... 340/432
4,710,745  12/1987  delRosario ................................ 340/428
4,750,094  6/1988  Kizsik ....................................... 362/157
4,972,172  11/1990  McLaughlin ............................. 340/426
5,038,133  8/1991  Martin ...................................... 340/426

*Primary Examiner*—Edward Lefkowitz
*Attorney, Agent, or Firm*—Ronald E. Smith

[57] ABSTRACT

A vehicle theft deterrent apparatus and method includes a flashing light emitting diode (LED) placed in a visible position within the passenger compartment of a vehicle to simulate an authenticate, armed security system. The flashing LED is powered by a DC power supply that is hidden behind a dashboard, under a carpet, in a glove compartment, or in some other remote, hidden location. An elongate, flexible conductor interconnects the LED and the power supply and is also hidden from view. The transverse cross section of the conductor enables it to be hidden at the base of a windshield or to extend through a small space between dashboard panels. The conductor is connected directly to the LED so that no housing for the LED is required and no holes need be drilled in the dashboard to accommodate a housing. A potential thief is deterred from a theft attempt because the only visible part of the apparatus is the flashing LED.

7 Claims, 2 Drawing Sheets

VEHICLE THEFT DETERRENT APPARATUS AND METHOD

CROSS-REFERENCE TO RELATED DISCLOSURES

This disclosure is a continuation-in-part of a pending disclosure bearing Ser. No. 08/507,831 entitled "Portable Vehicle Theft Deterrent Apparatus And Method" filed Jul. 27, 1995 by the same inventor, now abandoned.

BACKGROUND OF THE INVENTION

1. Field of the Invention

This invention relates, generally, to security devices for vehicles. More particularly, it relates to a device that simulates an armed anti-theft device.

2. Description of the Prior Art

Anti-theft devices for vehicles commonly include a flashing light mounted on the dashboard or in some other conspicuous location within the passenger compartment of the vehicle. A thief seeing such a light will attempt to steal a different vehicle because the flashing light warns the thief that the vehicle's anti-theft security system is armed and that any attempts at entering the vehicle will result in the activation of one or more alarm systems.

The flashing red light is typically provided in the form of a flashing light emitting diode (LED) mounted within a housing that is much larger and bulkier than the LED itself. A hole is drilled in the dashboard of the vehicle, or in some other visible part, to accommodate the housing. Thus, the obvious drawback of such systems is that they require permanent alteration of the dashboard or other interior surface.

The second drawback of such systems is their expense. Moreover, their installation typically requires the use of tools.

Accordingly, it would be desireable to have an inexpensive flashing light that would simulate the armed flashing light of a conventional anti-theft security sytstem. It would be even more advantagous if such a flashing light could be provided in the absence of any need to drill a hole in a dashboard or other car part, and in the absence of need for installation tools.

However, in view of the prior art considered as a whole at the time the present invention was made, it was not obvious to those of ordinary skill in the art how such a flashing light could be provided.

SUMMARY OF THE INVENTION

The longstanding but heretofore unfulfilled need for an apparatus that overcomes the limitations of the prior art is now met by a new, useful, and nonobvious invention. The present invention is a portable vehicle theft deterrent apparatus, mounted within the passenger compartment of a vehicle, that includes a flashing light emitting diode having a pair of electrical terminals, a power source, and an elongate, flexible conductor interconnecting said pair of electrical terminals and said power source.

The flashing light emitting diode is positioned at a preselected location within the passenger compartment of a vehicle so that it is visible from the outside of the vehicle.

The power source is positioned remote from the flashing light emitting diode in a preselected location that is hidden from view.

The conductor has a remote distal end connected to the power supply, and a proximal end connected to the pair of terminals. The conductor is positioned along its extent from the power supply to the pair of terminals in a preselected location that is hidden from view. Moreover, the conductor has a transverse cross section of sufficiently small size to enable its proximal end to extend through a small preselected space within the vehicle passenger compartment, such as a crack between contiguous dashboard panels, for example, and to connect directly to the pair of terminals so that the LED requires no housing, so that the flashing light emitting diode is the only part of the apparatus that is visible to an individual outside of the passenger compartment, so that the flashing light emitting diode simulates a flashing light emitting diode of an armed vehicle theft deterrent apparatus, and so that installation of the flashing light emitting diode requires no alteration of the passenger compartment in view of the absence of a housing for the LED.

From the summary of the apparatus just provided, it should be clear that the novel method includes the steps of: 1) positioning a flashing light emitting diode having a pair of electrical terminals at a preselected location within a passenger compartment of a vehicle, said preselected location being visible from outside the vehicle; 2) positioning a power source for the flashing light emitting diode at a preselected location, remote from the flashing light emitting diode, that is hidden from view from outside the vehicle; 3) connecting a remote distal end of a conductor to the power supply and connecting a proximal end of the conductor directly to said pair of electrical terminals of the flashing light emitting diode; 4) positioning the conductor within the passenger compartment so that the conductor is hidden from view along its extent; and 5) extending the proximal end of the conductor through a preselected small space to connect the proximal end directly to said pair of electrical terminals so that only the flashing light emitting diode is visible from outside the vehicle, so that the flashing light emitting diode simulates a flashing light emitting diode connected to an armed vehicle security system.

It is a primary object of this invention to provide a simulated vehicle theft deterrent apparatus that is considerably less expensive than an armed theft deterrent apparatus.

Another important object is to provide such an apparatus that is mountable within a vehicle passenger compartment without requiring alteration of said compartment.

An object closely related to the foregoing object is to provide an apparatus that lacks the bulky housing of a prior art armed apparatus.

Still another object is to provide such an apparatus having its own power pupply so that it does not rely upon the battery of the vehicle.

Yet another object is to provide such an apparatus having a toolless installation procedure.

Another object is to provide the needed apparatus in portable form so that it may be easily removed from a vehicle when the vehicle is sold or when it is desired to re-locate the novel apparatus to another vehicle such as a rental vehicle, e.g.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
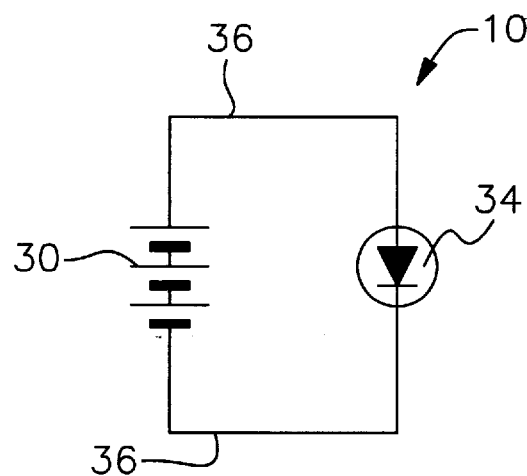
FIG. 1 is a circuit diagram of the electrical circuit incorporated in the novel vehicle theft deterrent apparatus.

Referring now to FIG. 1, it will there be seen that a circuit diagram for the novel vehicle theft deterrent apparatus is denoted by the reference numeral 10. Circuit 10 includes a power supply 30 electrically connected by conductor 36 to a flashing light emitting diode (LED) 34; positive voltage is connected to the anode of said flashing LED 34 and negative voltage is connected to the cathode of said flashing LED 34. The anode and cathode are hereinafter referred to as a pair of terminals. The terminals are denoted 33, 35 in FIG. 2.

Figure 2:
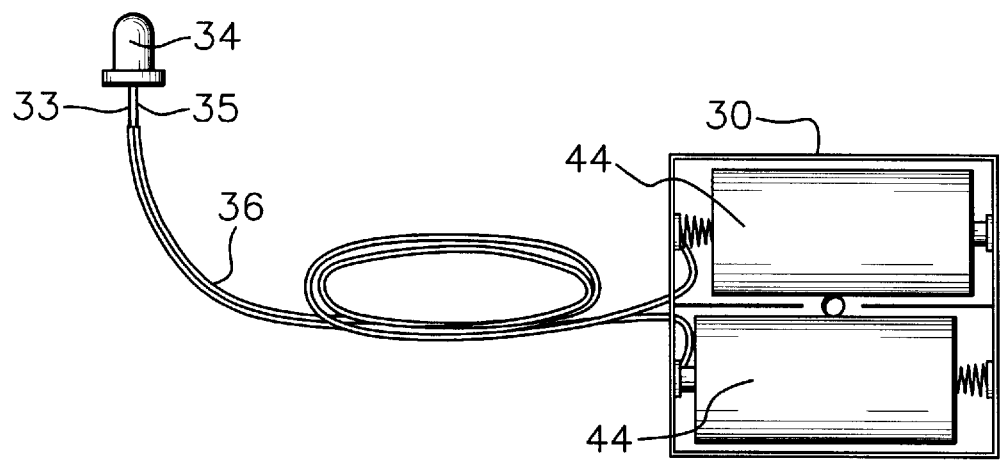
FIG. 2 is a partially cut-away view of the novel apparatus.

FIG. 2 illustrates the physical structure of the novel vehicle theft deterrent apparatus. Power supply 30 may be provided in the form of a conventional plastic battery holder having metallic electrical contacts. Two C-size batteries, collectively denoted 44, are connected in series to provide months of battery life. Batteries or power cells of any other size are within the scope of this invention. Conductor 36 is an elongate, flexible double circuit wire having a transverse cross section sufficiently small to extend through a narrow crack or space of the type that exists between mating dashboard panels, or in a narrow space where the bottom edge of a windshield meets a dashboard, and in other places having very small clearances.

Flashing LED 34 has an integrated timing device, not shown, to enable flashing. Power supply 30 provides three volts and could therefore be supplied in the form of a three volt power cell. However, it is less expensively formed by two 1.5 volt power cells or batteries connected in series. Preferably, a minimum of C-size power cells or batteries should be used so that the apparatus operates for months between battery replacements and is therefore convenient to the user.

Figure 3:
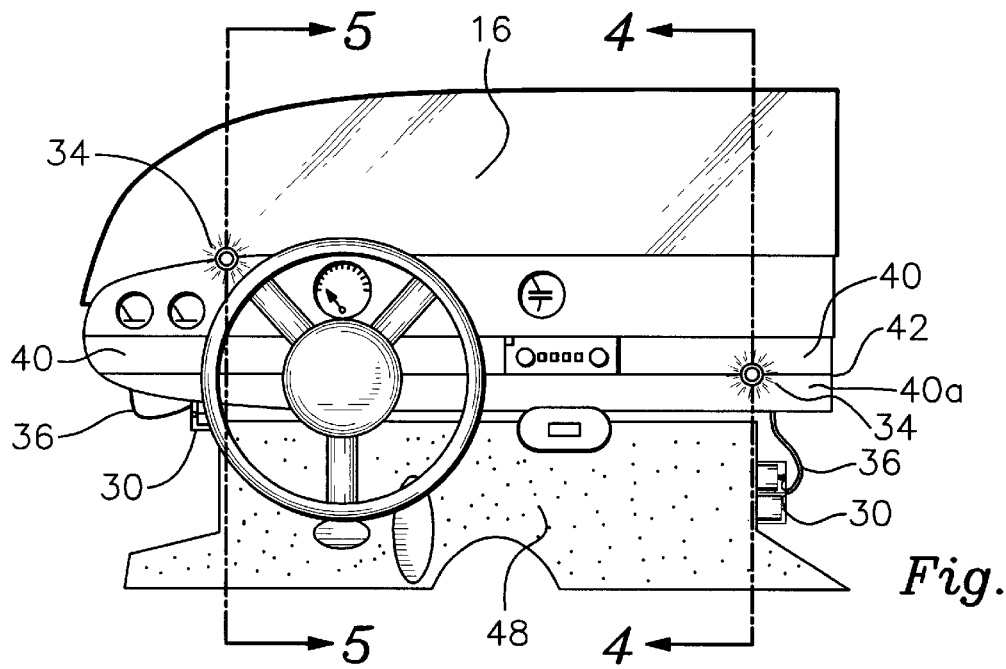
FIG. 3 depicts two typical mounting positions of the novel apparatus within a vehicle passenger compartment.
Figure 4:
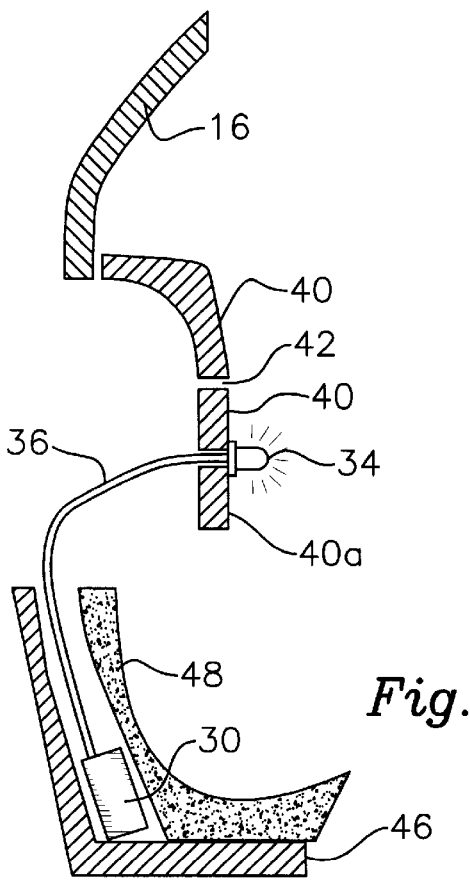
FIG. 4 is a sectional view taken along line 4—4 in FIG. 3.
Figure 5:
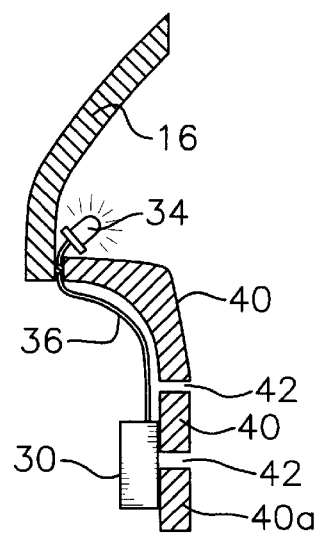
FIG. 5 is a sectional view taken along line 5—5 in FIG. 3.

FIGS. 3–5 illustrates two effective mounting locations for the novel apparatus.

As mentioned above, power supply 30 is electrically connected via conductor 36 to flashing LED 34. When flashing LED 34 is provided with sufficient DC voltage and sufficient current flow, flashing LED 34 becomes conductive and a periodic or flashing light is emitted in the well-known way. The flashing LED 34 is positioned within the vehicle passenger compartment, preferably in a position where it is readily visible from the outside of the vehicle. For example, as indicated in FIG.3, said flashing LED is depicted as having two locations. In view of the quick and easy installation and the very low cost of the novel apparatus, sold under the trademark Guardian 3000, one of more of said Guardian 3000s may be placed in each vehicle owned by the user, and an extra one may be purchased for use in rental vehicles or other vehicles in temporary custody of the user.

In the first location, depicted at the right side of FIG. 3 and having line 4—4 therethrough and being depicted in sectional view in FIG. 4, flashing LED 34 is advantageously fitted between mating panels 40, 40a of a dashboard, i.e., conductor 36 extends behind the dashboard from power supply 30 and then extends through a crack or very small space 42 between said abutting panels to reach flashing LED 34 which is mounted on the visible side of said dashboard panels. Significantly, LED 34 does not extend through said crack, i.e., conductor 36 is fed through preselected crack or space 42 from a preselected end of said crack or space so that LED 34 is positioned on the front, visible side of the panel or other interior part, and only the proximal end of said conductor is slipped through the crack or space until the desired position of LED 34 is obtained.

Power supply 30 may be positioned atop vehicle floor 46 and covered by carpet or mat 48 to hide it from view; it may also be hidden behind the dashboard or otherwise concealed.

Typical vehicle dashboard panels 40, 40a are made of compressible, flexible and resilient materials. Accordingly, when conductor 36 is inserted between said panels, the compressible dashboard material accommodates said conductor 36 so that it fits snugly into space 42 and is retained in place.

In a second exemplary mounting, as depicted in FIG. 5, LED 34 is positioned flush with a surface where the lowermost edge of windshield 16 and the forwardmost end of dashboard 40 meet. Conductor 36 is routed along that juncture, where it is hidden from view, and routed to power supply 30. Power supply 30 is positioned within the passenger compartment and hidden from view under dashboard panels 40, 40a. Alternatively, power supply 30 could be placed under the driver or passenger seat or in the glove compartment.

There are a variety of ways to accomplish the placement of conductor 36 and hence LED 34; most vehicle dashboards and other interior panels vary as between makes and models, but most if not all of them have at least one suitable location for the placement of the novel apparatus. Conductor 36 can be routed along mating panels, behind panels, through panels, or in a combination of said techniques. Dashboards in vehicles vary in construction details and the respective shapes thereof and materials used therein usually provide at least one suitable installation means for the novel apparatus. In difficult cases where no obvious installation is readily apparent, a part of a dashboard, an accessory such as a stereo, or an accessory plug where an accessory option is omitted, could be removed to enable installation of the novel apparatus; of course, the removed part is then re-installed. Significantly, even such a relatively difficult installation would not require a permanent alteration of the dashboard or other panel. A good time to install the novel apparatus in difficult cases would be at the time a new stereo or other accessory is installed.

The novel apparatus and method provide an inexpensive, convenient and reliable means for automotive theft and vandal protection. An on-off switch could be incorporated but such a switch is neither necessary nor advisable because such a switch might result in a user unintentionally leaving the vehicle unprotected. Battery life is of course variable, but those skilled in the art will appreciate the selection of C-size cells which provide about eight (8) months of LED operation at continuous use. The novel apparatus will not drain a vehicle battery if left in electrical communication therewith for long periods. Accordingly, it can be used with vehicles in storage such as vintage vehicles that are used only seasonally or on special occasions, even if such vehicles are not provided with a battery during long periods of storage.

The present invention provides a device and method that convincingly imitates a conventional alarm system. It is installed without tools, requires no electrical connection to a vehicle's battery, complements other anti-theft systems, and fits all vehicles, including vehicles lacking cigarette lighter outlets, all at a low cost.

Since LED 34 is not housed, no dashboard-altering holes are drilled, nor is there any need to alter any other part of the passenger compartment. The highly novel direct connection of the proximal end of conductor 36 to the unhoused terminals of LED 34 is the insight that eliminates the need for a housing and which enables fitting of said conductor through a small crack or a small space that can be found in virtually any vehicle passenger compartment on or in the vicinity of the dashboard. This enables the placement of the novel LED at a place where it will be seen by a potential thief, while ensuring that the power supply and conductor remain hidden from view so that the non-armed status of the LED is not ascertainable from without said vehicle.

LED 34 and power source 30 which includes the battery holder are commercially available from Tandy Corporation as part numbers 276-036 and 270-385, respectively.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A vehicle theft deterrent apparatus, comprising:
    a flashing light emitting diode having a pair of electrical terminals;
    a power source;
    an elongate, flexible conductor interconnecting said pair of electrical terminals and said power source;
    said flashing light emitting diode being positioned at a preselected location within a passenger compartment of a vehicle so that it is visible from the outside of the vehicle;
    said power source being positioned remote from said flashing light emitting diode in a preselected location that is hidden from view;
    said conductor having a remote distal end connected to said power supply;
    said conductor having a proximal end connected directly to said pair of terminals;
    said conductor being positioned along its extent from said power supply to said pair of terminals in a preselected location that is hidden from view;
    said conductor having a transverse cross section of sufficiently small size to enable its proximal end to extend through a small preselected space within said vehicle passenger compartment and to connect directly to said pair of terminals;
    whereby said flashing light emitting diode is the only part of said apparatus that is visible to an individual outside of said passenger compartment;
    whereby said flashing light emitting diode simulates a flashing light emitting diode of an armed vehicle theft deterrent apparatus; and
    whereby installation of said flashing light emitting diode requires no alteration of said passenger compartment, because the direct connection of said conductor to said pair of terminals eliminates the need for an alteration-requiring housing.

2. The apparatus of claim 1, wherein said small preselected space is a space between dashboard panels.

3. The apparatus of claim 1, wherein said small preselected space is a preselected position along a juncture of a windshield and a dashboard.

4. The apparatus of claim 3, wherein said conductor is positioned along a lowermost edge of a windshield and a forwardmost end of a dashboard.

5. The apparatus of claim 1, wherein said power supply is independent of a power supply of said vehicle.

6. The apparatus of claim 1, wherein said conductor is a double circuit stranded wire.

7. A method of protecting a vehicle from vandalism, burglary and theft, comprising the steps of:
    positioning a flashing light emitting diode having a pair of electrical terminals at a preselected location within a passenger compartment of a vehicle, said preselected location being visible from outside the vehicle;
    positioning a power source for said flashing light emitting diode at a preselected location, remote from said flashing light emitting diode, that is hidden from view from outside said vehicle;
    connecting a remote distal end of a conductor to said power supply and connecting a proximal end of said conductor directly to said pair of electrical terminals of said flashing light emitting diode;
    positioning said conductor within said passenger compartment so that said conductor is hidden from view along its extent;
    extending said proximal end of said conductor through a preselected small space to connect said proximal end directly to said pair of electrical terminals so that only said flashing light emitting diode is visible from outside said vehicle;
    whereby said flashing light emitting diode simulates a flashing light emitting diode connected to an armed vehicle security system.

* * * * *